United States Patent [19]

Hull et al.

[11] Patent Number: 5,640,887

[45] Date of Patent: Jun. 24, 1997

[54] LOW-LOSS, HIGH-SPEED, HIGH-$T_C$ SUPERCONDUCTING BEARINGS

[75] Inventors: John R. Hull, Hinsdale; Thomas M. Mulcahy, Western Springs; Kenneth L. Uherka, Frankfort, all of Ill.

[73] Assignee: University of Chicago, Chicago, Ill.

[21] Appl. No.: 486,782

[22] Filed: Jun. 7, 1995

Related U.S. Application Data

[63] Continuation of Ser. No. 25,950, Mar. 3, 1993, Pat. No. 5,540,116.

[51] Int. Cl.⁶ .................................................. G05G 1/00
[52] U.S. Cl. ........................ 74/572; 74/573 R; 310/349; 310/90.5; 505/166
[58] Field of Search ................ 74/572–574; 310/90.5, 310/349, 191; 505/166; 501/1

[56] References Cited

U.S. PATENT DOCUMENTS

| | | | |
|---|---|---|---|
| 3,892,185 | 7/1975 | Guderjahn | 238/150 X |
| 5,099,216 | 3/1992 | Pelrine | 335/220 |
| 5,214,981 | 6/1993 | Weinberger et al. | 74/573 R |
| 5,220,232 | 6/1993 | Rigney et al. | 310/90.5 |
| 5,256,638 | 10/1993 | Weinberger et al. | 310/90.5 |
| 5,270,601 | 12/1993 | Rigney | 310/90.5 |
| 5,298,875 | 3/1994 | Laibowitz et al. | 310/90.5 X |
| 5,302,874 | 4/1994 | Pinkerton | 310/90.5 |
| 5,396,136 | 3/1995 | Pelrine | 310/90.5 |
| 5,436,516 | 7/1995 | Yamazaki et al. | 310/90.5 |
| 5,457,086 | 10/1995 | Rigney | 505/122 |
| 5,481,146 | 1/1996 | Davey | 310/90.5 |

*Primary Examiner*—Vinh T. Luong
*Attorney, Agent, or Firm*—Reinhart, Boerner, Van Deuren, Norris & Rieselbach, s.c.

[57] ABSTRACT

A flywheel energy storage device including an iron structure disposed for rotation adjacent a stationary superconductor material structure and a stationary permanent magnet. The stationary permanent magnet levitates the iron structure while the superconductor structure can stabilize the rotating iron structure.

14 Claims, 4 Drawing Sheets

LOW-LOSS, HIGH-SPEED, HIGH-T$_C$ SUPERCONDUCTING BEARINGS

CONTRACTUAL ORIGIN OF THE INVENTION

This is a continuation of application Ser. No. 08/025,950 filed on Mar. 3, 1993, now U.S. Pat. No. 5,540,116.

The United States Government has certain rights in this invention pursuant to Contract No. W-31-109-ENG-38 between the U.S. Department of Energy and The University of Chicago, representing Argonne National Laboratory.

BACKGROUND OF THE INVENTION

The present invention generally relates to a high temperature superconductor ("HTSC") device. More particularly, the invention relates to structural geometries for rotational HTSC devices to achieve lower rotational dissipations, higher magnetic pressures and higher rotational velocities.

Efficient electrical energy storage is useful in numerous practical applications. Diurnal storage of electricity is important to electric utilities in order to efficiently utilize base load generating plants and to meet the varying load demands of their customers. Base load plants can charge storage units at night when demand is low, and then peak demands can be met by discharging the storage units during the peak hours.

Energy storage can also play a substantial role in eliminating or postponing the installation of larger capacity power lines. For example, power can be transferred from a baseload generating plant to a substation having energy storage units at night when demand is low. During peak power demand times, the energy storage units can be discharged. These energy storage units can also be located in other parts of the electrical distribution system: utility parks where large amounts of energy can be stored; in tandem with photovoltaic or wind energy generation facilities that are time dependent; substation units; and individual companies and homes. Similar energy storage units can be used on electric vehicles such as cars and buses, or as wayside energy storage for electric trains.

Flywheels are often considered for energy storage unit applications. Their primary advantages are modularity, high energy storage density (Wh/kg), and high efficiency input and output of electrical energy. The ability to produce high strength flywheel rotors and the ability to efficiently transfer energy in and out of a flywheel are well known and will not need to be discussed in this application.

The primary disadvantage of conventional flywheels is inefficiency in the standby mode. Substantial energy losses occur because the conventional ball beatings that support the flywheel structure have high losses. Conventional ball beatings have relatively large coefficients of friction, are subject to wear and also require lubrication.

Alternatively, magnetic beatings can be used to support the flywheel structure. Conventional magnetic beatings have no contacting parts, require no lubrication, and often have lower losses than ball beatings. However, magnetic beatings require position sensors and feedback electronics to keep the beatings stable. Further, energy losses associated with conventional magnetic beatings are still sufficiently high that diurnal storage of energy in a flywheel is relatively inefficient. Energy losses in a conventional magnetic beating are attributable to magnetic drag and parasitic losses from passing current through the windings of the electromagnets in the beatings. A state-of-the-art flywheel energy storage unit with a magnetic beating typically loses about 1% of the stored energy per hour due to energy losses attributable to the beatings.

Superconducting beatings have the potential to reduce such energy loss to very low values. One example of such a structure is described in U.S. patent application Ser. No. 07/736,677, which is incorporated by reference herein in its entirety, and is assigned to the owner of the instant invention. In this other application, a permanent magnet is rotated over an HTSC material structure. The disadvantage of this configuration is that any azimuthal nonuniformity in the rotating permanent magnets produces an alternating current magnetic field at the surface of the HTSC material. This field, in turn, induces hysteresis losses in the HTSC material; and the associated energy must be removed at cryogenic temperatures. Another disadvantage of this type of beating is that the permanent magnet has a relatively low tensile strength and therefore cannot withstand high rotational speeds. In addition, there is a limitation in magnetic pressure due to the magnetic fields of the permanent magnets.

It is therefore an object of the invention to provide a novel low-loss magnetic beating and method of use in a high-efficiency flywheel energy storage device.

It is a further object of the invention to provide an improved flywheel with low standby energy losses when the storage time is about one day or longer.

It is yet another object of the invention to provide a novel low drag force magnetic beating comprising a permanent magnet, an HTSC material and a ferromagnetic rotor.

It is still a further object of the invention to provide an improved rotor capable of very high rotational speeds using a superconductor material beating.

It is an additional object of the invention to provide a novel high-efficiency flywheel energy storage device with a high degree of rotational symmetry.

It is yet a further object of the invention to provide an improved high-efficiency flywheel energy storage device with high magnetic field azimuthal homogeneity.

It is still an additional object of the invention to provide a novel high-efficiency flywheel energy storage device having lower rotational dissipation and higher magnetic levitation pressure.

It is yet another object of the invention to provide an improved flywheel energy storage device which minimizes hysteresis and eddy current losses.

Other objects, features and advantages of the present invention will be readily apparent from the following description of the preferred embodiments thereof, taken in conjunction with the accompanying drawings described below wherein like elements have like numerals throughout the several views.

DESCRIPTION OF PREFERRED EMBODIMENTS

Figure 1A:
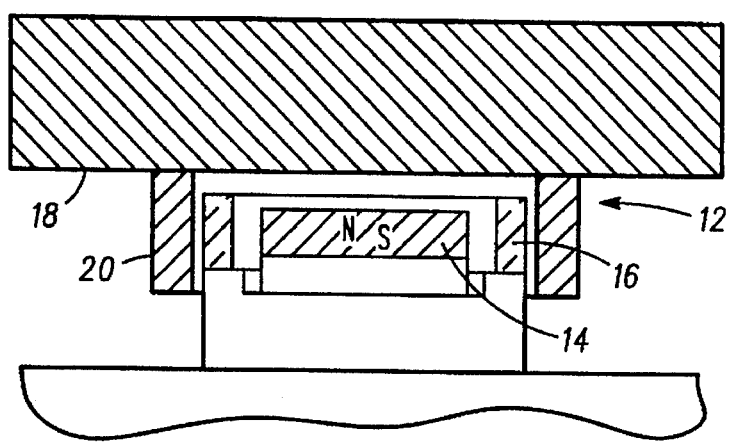
FIG. 1A illustrates a cross-sectional view of a flywheel energy storage device constructed in accordance with one form of the invention which includes a levitated iron ring and steel flywheel.

Referring to the figures and more particularly to FIG. 1A, a flywheel energy storage device (hereinafter "flywheel device") constructed in accordance with one form of the invention is indicated generally at 10. This preferred embodiment incorporates magnetic beatings 12 that utilize a permanent magnet disk 14 and an HTSC material ring 16 to levitate a steel flywheel rotor 18 connected to an iron ring 20. The iron ring 20 interacts magnetically with the stationary permanent magnet disk 14 to provide stable vertical levitation. The HTSC material ring 16 is interposed between the iron ring 20 and the permanent magnet disk 14. When magnetic flux passes through, and is pinned in the HTSC material ring 16, the magnetic field provides horizontal stability to the steel flywheel rotor 18.

In the preferred embodiments described herein, as a nonlimiting example, "Type II" HTSC materials have been found to yield excellent results. These materials enable some magnetic flux to penetrate into the interior of the material itself in clusters of flux lines. This allows Type II HTSC material to generate large magnetic fields and exert a "pinning" effect on a rotating magnetic flywheel. Further information on these materials can be found in U.S. Pat. No. 4,939,120 (Moon, et al.) which is incorporated by reference herein in its entirety. The HTSC material must be cooled to a temperature below $T_c$ to become superconducting. This cooling can be accomplished by immersing the HTSC material in a cryogenic fluid, such as liquid nitrogen, or by thermally connecting the HTSC material to a refrigerator component via a conductive coldfinger. Because these techniques are conventionally known, they are typically not shown in the figures. It will be further understood by one skilled in the art that the flywheel device 10 can be encased in a vacuum chamber and will have a means of providing power input and output.

In the preferred embodiments of the invention wherein the permanent magnets are not part of the flywheel rotor 18, the iron ring 20 is preferably mechanically constrained before and during, but not after, the field cooling of the HTSC material ring 16. While ring-shaped structures are described herein for nonlimiting, illustrative purposes, other shapes may be used equivalently in the embodiments described herein. It will be apparent to one skilled in the art that the iron ring 20 can be composed of any material with a high magnetic permeability (e.g., magnetic steels or nickel and its alloys) and is preferably of high mechanical strength.

Figure 1B:
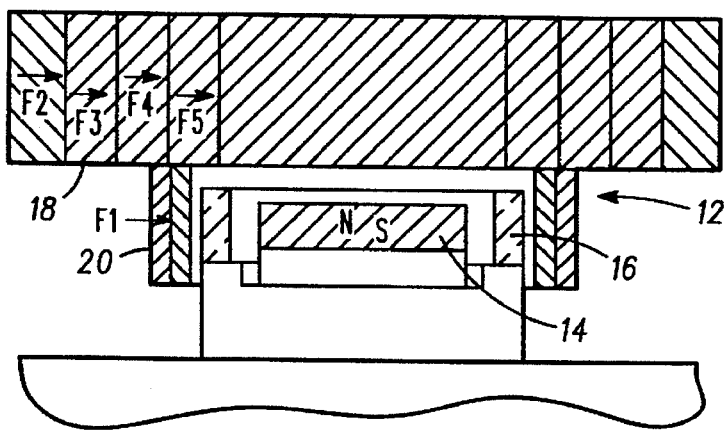
FIG. 1B shows a cross-sectional view of an alternative embodiment of the device shown in FIG. 1A and having a steel flywheel and iron ring comprising a series of nested bands.

Further, the steel flywheel rotor 18 and/or the iron ring 20 shown in FIG. 1A (and for all subsequent figures and embodiments) need not be a single ring. As shown in FIG. 1B, the steel flywheel rotor 18 and/or the ring 24 can instead comprise a series of nested steel bands 22 with the outer ones of the bands 22 putting the inner ones of the bands 22 in compression.

Figure 1C:
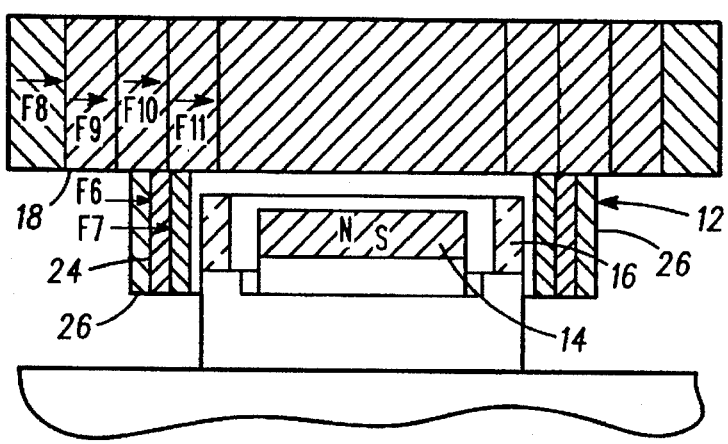
FIG. 1C illustrates a cross-sectional view of an alternative embodiment of the device shown in FIG. 1A and having a flywheel and iron ring comprising a series of nested steel bands surrounded by fiber-composite rings.

An alternative embodiment of this nested steel band concept surrounds the steel ring 24 (or series of bands 22) by a light-weight fiber-composite ring 26 that puts the steel ring 24 in precompression as shown in FIG. 1C. The fiber composite ring 26 composite can be made, for example, from E-glass epoxy, Kevlar®, a trademark of E. I. Du Pont de Nemours and Company for a durable spun fiber composite material, carbon-carbon composite, or other equivalent materials. The precompression helps offset the tension which results from centrifugal forces, thereby allowing rotation of the steel ring 24 at higher rotational velocities without structural failure.

Figure 2:
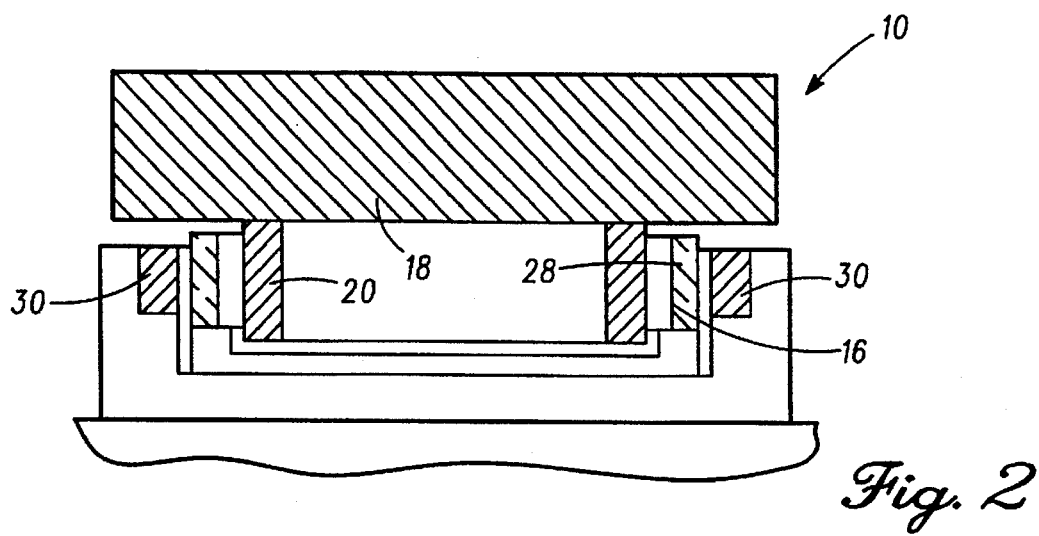
FIG. 2 shows a cross-sectional view of an alternative embodiment of a flywheel energy storage device including a levitated flywheel and an iron ring disposed within a stationary permanent magnet and HTSC material rings.

In another embodiment of the invention illustrated in FIG. 2, the permanent magnet 28 comprises a stationary rare earth magnet ring 30 located outside of the iron ring 20. A stationary HTSC material ring 16 is located between the iron ring 20 and the rare-earth magnet ring 30 and again provides horizontal stability.

Figure 3A:
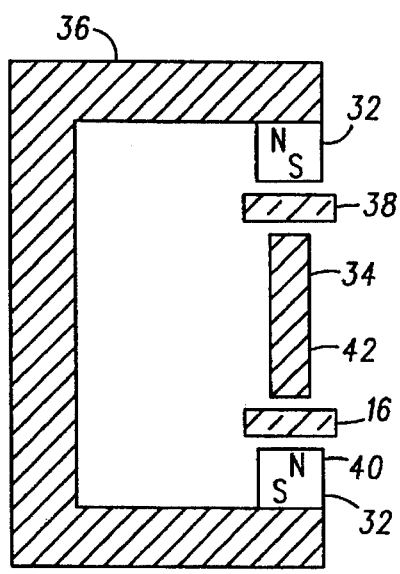
FIG. 3A illustrates a cross-sectional view of a stationary iron structure supporting a permanent magnet and a stationary HTSC ring levitating an iron flywheel.
Figure 3B:
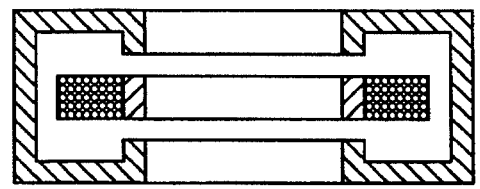
FIG. 3B shows a cross-sectional view of a flywheel with an embedded iron ring levitated within an enclosed iron structure.
Figure 3C:
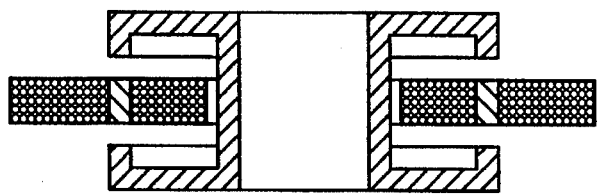
FIG. 3C illustrates a cross-sectional view of a flywheel having an embedded iron ring levitated about the circumference of the bearing.
Figure 3D:
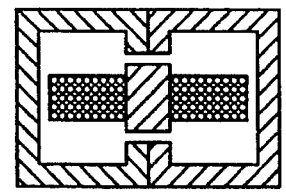
FIG. 3D shows a cross-sectional view of a levitated flywheel including an iron center portion.

As shown in FIG. 3A, an alternative embodiment of one form of the invention includes two stationary permanent magnets 32, an iron flywheel ring 34 and an iron yoke 36 which form an efficient magnetic circuit. HTSC material disks 38 are placed between the iron flywheel ring 34 and each stationary permanent magnet 32. In this configuration, the magnetic circuit provides a large magnetic flux density and stable lateral positioning of the iron flywheel ring 34. The flux is trapped in the field-cooled HTSC material disks 38 which provide both vertical levitation and stability. The top and bottom gaps between the stationary permanent magnets 32 and the iron ring 34 can be of different dimensions to provide varying vertical levitation. Alternatively, a permanent magnet ring 40, HTSC material ring 16 and iron shaft 42 can be used in the same arrangement shown in FIG. 3A. Various geometries using this concept are illustrated in FIGS. 3B, 3C and 3D. For clarity, the individual HTSC material and permanent magnet elements are not shown, but are similar in arrangement to FIG. 3A.

Figure 3E:
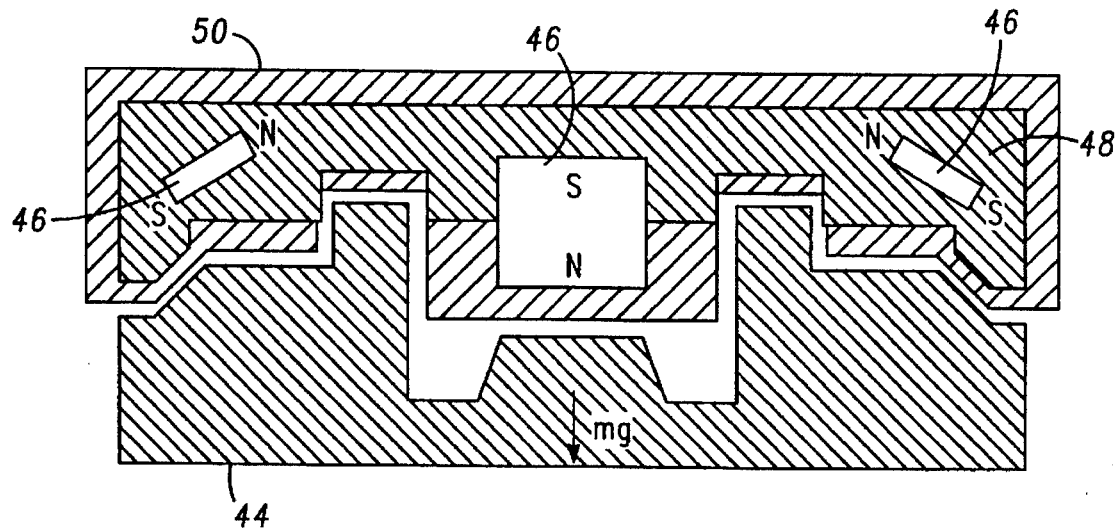
FIG. 3E illustrates a cross-sectional view of another embodiment of one form of the invention wherein an HTSC materrial-encapsulated iron structure includes permanent magnets for levitating an iron flywheel ring.

The configuration of FIG. 3E is a generalization of the basic concept shown in FIG. 3A, wherein some efficiency of the magnetic circuit is sacrificed to achieve larger levitation forces. An iron flywheel disk 44 is levitated by stationary rare earth permanent magnets 46 which are encased in a stationary iron disk 48. The stationary iron disk 48 is encapsulated by an HTSC material structure 50. Parameters that can be varied to achieve a wide range of design objectives include, for example, the following: (1) the distribution of the stationary rare earth magnets 46; (2) the shape of the stationary iron disk 48 (for completing the magnetic circuit); (3) the spacings between the stationary iron disk 48 and the levitated iron flywheel disk 44; and (4) the variable thickness HTSC material structure 50 encapsulation.

Figure 4A:
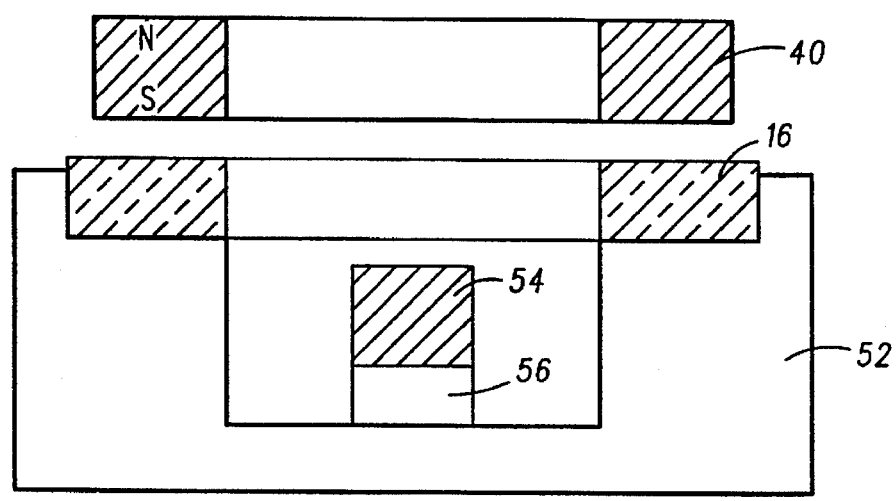
FIG. 4A shows a cross-sectional view of a permanent magnet ring levitated by a stationary HTSC material ring and a stationary magnet which can be adjustably positioned.

FIG. 4A illustrates a configuration in which the magnetic pressure is increased over that amount which can be obtained with only a permanent magnet ring 40 being levitated over an HTSC material ring 16. A generally cylindrical liquid nitrogen "coldfinger" 52 or cryogen immersion surrounds a stationary cylindrical magnet 54 in this embodiment. The stationary cylindrical magnet 54 is placed on an insulator 56 of selectable height and position. A stationary HTSC material ring 16 preferably comprising HTSC material pieces is placed on top of, and is substantially surrounded by, the liquid nitrogen coldfinger 52. The rare earth permanent magnet ring 40 is levitated over the stationary HTSC material ring 16 and the stationary cylindrical magnet 54. In this embodiment, the stationary cylindrical magnet 54 provides an additional levitation force on the rare earth permanent magnet ring 40. Therefore, because the amount of rotor weight able to be supported increases for the same rotating magnetic field on the surface of the HTSC material ring 16, this configuration should provide lower losses than if the stationary cylindrical magnet 54 were absent. Also, this embodiment provides greater control of the positioning of the permanent magnet ring 40. This is accomplished by allowing the position of the stationary cylindrical magnet 54 to be adjusted to help balance the forces in the system.

Figure 4B:
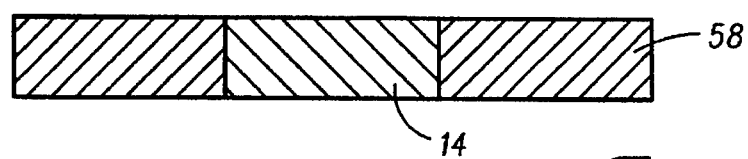
FIG. 4B illustrates a cross-sectional view of an alternative stationary magnet for the structure shown in FIG. 4A wherein the stationary magnet for position adjustment comprises an iron ring with a radially magnetized permanent magnet disk at its center.

FIG. 4B shows an alternative embodiment of the stationary magnet configuration illustrated in FIG. 4A. In this embodiment, the stationary magnet structure comprises a permanent magnet disk 14 generally surrounded by a stationary iron ring 58. The permanent magnet disk 14 is magnetized radially. The stationary iron ring 58 serves to decreases the reluctance in the magnetic circuit, thereby further increasing the levitation force.

Figure 5A:
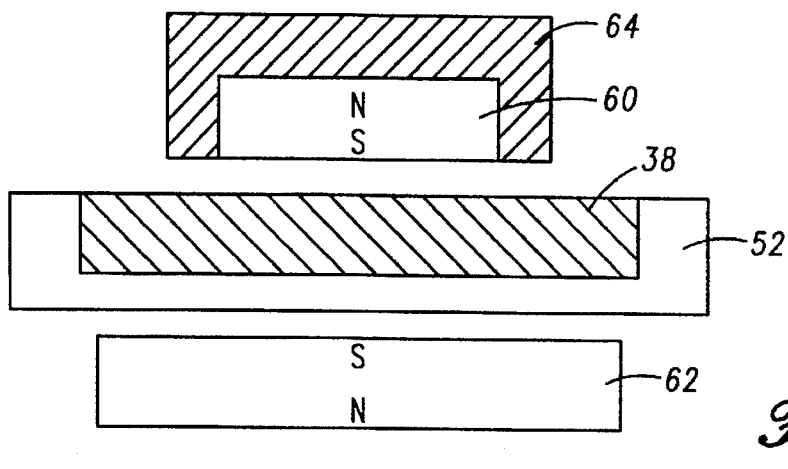
FIG. 5A shows a cross-sectional view of a permanent magnet flywheel disposed within an iron cup levitater by HTSC material and a supplementary magnet.

FIG. 5A shows an apparatus in which a large levitation force is achieved, and a rare earth rotor magnet 60 can also achieve high rotational velocities. In this embodiment, a supplementary magnet 62 is located below the generally cylindrical liquid nitrogen coldfinger 52. An HTSC material disk 38 (or plurality of HTSC material pieces) is generally contained within the liquid nitrogen coldfinger 52. An iron cup 64 with the rare earth rotor magnet 60 located therein is levitated above the HTSC material disk 38 and the supplementary magnet 62. The supplementary magnet 62 increases the magnetic levitation force by acting directly on the rare earth rotor magnet 60. The HTSC material disk 38 also produces a levitation force, as well as providing horizontal stabilization. The iron cup 64 positioned over the rare earth rotor magnet 60 decreases the reluctance of the magnetic circuit around the rare earth rotor magnet 60, thus increasing the magnetic field and levitational force. It also increases the gradient of the magnetic fields near the boundary between the rare earth rotor magnet 60 and the iron cup 64, thus increasing the stiffness of the levitational force. Additionally, the iron cup 64 can precompress the rare earth rotor magnet 60 and act as a strengthening material to keep the rare earth rotor magnet 60 intact at high rotational speeds. Finally, small magnets or pieces of iron can be added or iron pieces can be removed from the iron cup 64 to improve the azimuthal homogeneity of the magnetic field.

Figure 5B:
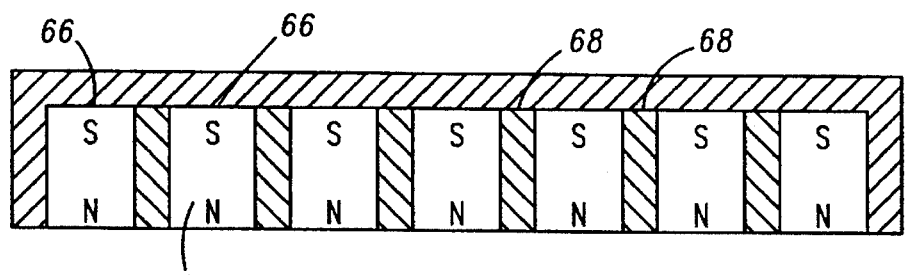
FIG. 5B illustrates a cross-sectional view of an alternative flywheel magnet structure disposed in an iron cup including radial bands and several magnetic rings for use in the structure shown in FIG. 5A.

In the alternative embodiment shown in FIG. 5B, the rare earth rotor magnet 60 comprises a series of concentric permanent magnet rings 66 separated by concentric iron rings 68. The iron rings 68 act both as strengthening members and as reluctance reducers. The magnet rings 66 can be selectively rotated to achieve better magnetic field axial symmetry. Additionally, the moments of the magnet rings 66 can be alternated to provide larger magnetic gradients and levitation stiffness.

Figure 5C:
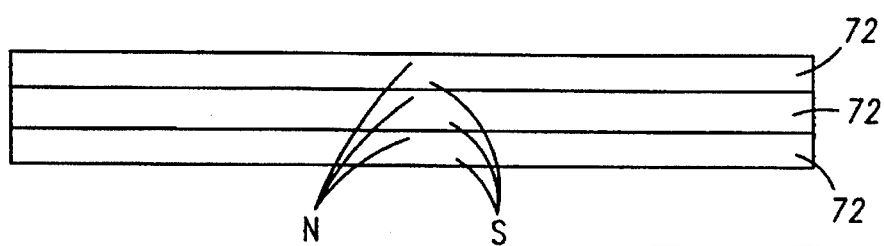
FIG. 5C shows a cross-sectional view of an alternative cup magnet structure for the embodiment shown in FIG. 5A.

Yet another alternative embodiment is illustrated in FIG. 5C, in which the rotor magnet 60 comprises a series of disks 72 stacked on top of each other. Asymmetric magnetic fields are often produced by rare earth magnets due to imperfections in the magnet structure. By appropriately rotating each of the disks 72 relative to the others, asymmetries in the magnetic field produced by the rotor magnet 60 can be reduced. For example, with two of the disks 72, the maximum field of one of the disks 72 can be located directly under the minimum field of the second. The asymmetry of the combined field will be the lowest possible for these two disks 72.

Figure 6:
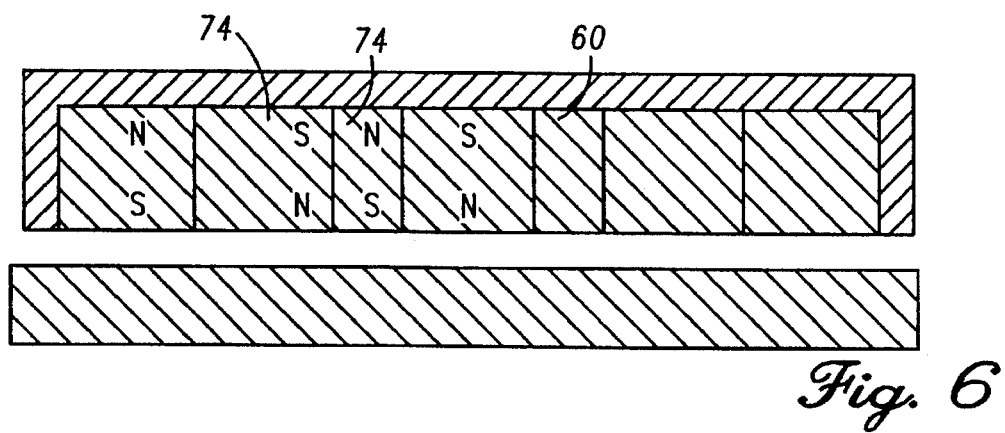
FIG. 6 illustrates a permanent magnet flywheel consisting of a series of alternating polarity magnets.

Another embodiment of the configuration of FIG. 5A is shown in FIG. 6 wherein the rare earth rotor magnet 60 comprises a series of alternating polarity magnet rings 74. These magnet rings 74 increase the stiffness of the levitational force by channeling the magnetic flux between adjacent poles of the magnet rings 74. The iron cup 64 surrounding the entire assembly acts to mechanically strengthen the rare earth rotor magnet 60 and reduce the reluctance of the magnetic circuit.

Accordingly, the preferred embodiments described herein significantly decrease energy losses attributable to bearings in a flywheel energy storage device. Practical applications for which these devices have historically been unsuitable can now utilize the significant efficiency and performance advantages of the present invention.

While preferred embodiments have been illustrated and described, it should be understood that changes and modifications can be made therein without departing from the invention in its broader aspects. Various features of the invention are defined in the following claims.

What is claimed is:

1. A flywheel energy storage device, comprising:
   a rotational iron structure disposed for rotation adjacent a stationary superconductor material structure and a stationary permanent magnet structure, said iron structure being levitated by said stationary permanent magnet structure.

2. The device of claim 1, wherein said stationary superconductor material structure and said stationary permanent magnet structure are disposed within at least a portion of said iron structure.

3. The device of claim 1, wherein said iron structure comprises ferromagnetic steel.

4. The device of claim 1, wherein said iron structure comprises a plurality of steel bands.

5. The device of claim 1, whereto at least a portion of said iron structure is substantially surrounded by a composite material structure.

6. The device of claim 5, wherein said composite material structure is disposed to produce compressive forces in said iron structure.

7. The device of claim 1, wherein said stationary high temperature superconductor material structure comprises a plurality of substantially concentric rings.

8. The device of claim 1, wherein said stationary permanent magnet structure comprises a plurality of substantially concentric rings.

9. The device of claim 1, wherein said iron structure comprises a disk-shaped structure.

10. The device of claim 1, wherein said iron structure comprises a ring-shaped structure.

11. The device of claim 1, wherein said iron structure comprises a substantially cylindrical-shaped structure.

12. The device of claim 1, wherein said stationary superconductor material structure comprises a superconductor material capable of allowing magnetic flux to penetrate said material.

13. The device of claim 1, wherein said stationary superconductor material structure is disposed between said iron structure and said stationary permanent magnet structure.

14. The device of claim 1, further including a second stationary high temperature superconductor material structure and a second stationary permanent magnet structure for producing additional levitational pressure upon said iron structure.

* * * * *

UNITED STATES PATENT AND TRADEMARK OFFICE
CERTIFICATE OF CORRECTION

PATENT NO. : 5,640,887
DATED : June 24, 1997
INVENTOR(S) : John R. Hull, et al.

It is certified that error appears in the above-indentified patent and that said Letters Patent is hereby corrected as shown below:

In Column 1, line 49, delete "beatings" and insert --bearings--.
In Column 1, line 50-51, delete "beatings" and insert --bearings--.
In Column 1, line 53, delete "beatings" and insert --bearings--.
In Column 1, line 54, delete "beatings" and insert --bearings--.
In Column 1, line 56, delete "beatings" (twice) and
    insert --bearings-- (twice).
In Column 1, line 58, delete "beatings" and insert --bearings--.
In Column 1, line 59, delete "beatings" and insert --bearings--.
In Column 1, line 61, delete "beating" and insert --bearing--.
In Column 1, line 64, delete "beatings" and insert --bearings--.
In Column 1, line 65, delete "beating" and insert --bearing--.
In Column 1, line 67, delete "beatings" and insert --bearings--.
In Column 2, line 1, delete "beatings" and insert --bearings--.
In Column 2, line 13, delete "beating" and insert --bearing--.
In Column 2, line 19, delete "beating" and insert --bearing--.
In Column 2, line 26, delete "beating" and insert --bearing--.
In Column 2, line 30, delete "beating" and insert --bearing--.
In Column 3, line 6, delete "beating" and insert --bearing--.
In Column 3, line 9, delete "materrial" and insert --material--.
In Column 3, line 21, delete "levitater" and insert --levitated--.
In Column 3, line 38, delete "beatings" and insert --bearings--.
In Column 6, line 30, delete "beatings" and insert --bearings--.

UNITED STATES PATENT AND TRADEMARK OFFICE
CERTIFICATE OF CORRECTION

PATENT NO. : 5,640,887
DATED : June 24, 1997
INVENTOR(S) : John R. Hull, et al.

It is certified that error appears in the above-indentified patent and that said Letters Patent is hereby corrected as shown below:

In Column 6, line 56, delete "whereto" and insert --wherein--.

Signed and Sealed this

Fourteenth Day of July, 1998

Attest:

Attesting Officer

BRUCE LEHMAN

Commissioner of Patents and Trademarks